(12) United States Patent
Muramatsu et al.

(10) Patent No.: US 6,933,641 B2
(45) Date of Patent: Aug. 23, 2005

(54) STATOR ASSEMBLY

(75) Inventors: Kazuhiko Muramatsu, Fukuroi (JP);
Yoshio Kinoshita, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/160,250

(22) Filed: Jun. 4, 2002

(65) Prior Publication Data
US 2002/0180288 A1 Dec. 5, 2002

(30) Foreign Application Priority Data
Jun. 5, 2001 (JP) .......................................... 2001-169315

(51) Int. Cl.$^7$ .............................. H02P 2/09; F16D 41/07
(52) U.S. Cl. ........................ 310/90; 384/585; 308/177; 192/45.1; 192/41; 188/2.8
(58) Field of Search .................... 310/90; 384/585; 792/45; 308/177; 380/582; 192/45.1; 182/41; 188/2, 8

(56) References Cited

U.S. PATENT DOCUMENTS

| | | | | | |
|---|---|---|---|---|---|
| 3,953,970 | A | * | 5/1976 | Fuehrer | 60/337 |
| 4,213,660 | A | * | 7/1980 | Yasui | 208/177 |
| 5,632,363 | A | * | 5/1997 | Kubo | 192/54.1 |
| 5,829,557 | A | * | 11/1998 | Halasy-Wimmer et al. | 310/54 |
| 6,123,179 | A | * | 9/2000 | Chen | 192/64 |
| 6,355,996 | B1 | * | 3/2002 | Birkestrand | 188/162 |

* cited by examiner

Primary Examiner—Darren Schuberg
Assistant Examiner—Iraj A. Mohandesi
(74) Attorney, Agent, or Firm—Miles & Stockbridge P.C.

(57) ABSTRACT

The present invention provides a stator assembly in which axial side portions of the assembly are supported by needle bearings, wherein projections are formed on flange portions provided on races of the needle bearings and the projections are fitted into recesses formed in the side portions of the stator assembly.

8 Claims, 10 Drawing Sheets

STATOR ASSEMBLY

BACKGROUND OF THE INVENTION

1. Field of the Invention

The present invention relates to a stator assembly of a torque converter used with an automatic transmission of a vehicle and the like. More specifically, the present invention relates to a stator assembly for a torque converter, which is supported by needle bearings in an axial direction.

2. Related Background Art

FIG. 17 is an axial sectional view of a conventional stator assembly into which needle bearings are incorporated. On the other hand, FIG. 18 is a front view of the stator assembly, looked at from a direction shown by the arrow VIX, shoving that a race of the needle bearing is fitted in a side portion of a bush in the conventional assembly.

In FIG. 17, a stator assembly 150 comprises a vane wheel 160 and an outer race 168 of a one-way clutch 170 is fitted into an inner periphery of the vane wheel 160. The one-way clutch 170 is a one-way clutch of sprag type and includes an outer race 168, an inner race 162 disposed within the outer race 168 in a concentric relationship thereto, sprags 163 disposed between the outer race 168 and the inner race 162 and adapted to transmit torque, holders 164 for holding the sprags, and ribbon springs 165 for applying cocking moment to the respective sprags to engage them with the outer and inner races.

On axial both ends of the inner race 162 and the outer race 168, there are provided bushes 161, 172 for maintaining both races in the concentric relationship and for preventing the holders 164 and the ribbon springs 165 from dislodging in the axial direction. The bushes 161, 172 are axially stationary with respect to the vane wheel 160 by means of snap rings 166, 167, respectively.

Races 174, 171 of needle bearings 173, 169 are fitted in stepped portions formed on the bushes 161, 172 axially outwardly. The races 174, 171 are provided with annular extensions that are fitted in stepped portions formed on the bushes or the inner periphery of the vane wheel. As shown in FIG. 18, four extensions disposed along the circumferential direction are fitted in the respective stepped portions of the bush.

In the above-mentioned conventional stator assembly, since axial movements of the races of the needle bearings are not restricted, there arises a problem that the needle bearings may be dislodged during conveyance and transportation.

SUMMARY OF THE INVENTION

Accordingly, an object of the present invention is to provide a stator assembly that can be handled integrally or collectively, including needle bearings.

To achieve the above object, the present invention provides a stator assembly in which axial side portions of the assembly are supported by needle bearings, wherein projections are formed on flange portions provided on races of the needle bearings and the projections are fitted into recesses formed in the side portions of the stator assembly.

Further, a stator assembly of the present invention in which axial side portions of the assembly are supported by needle bearings is characterized in that the needle bearing includes a flange portion formed by cutting an outer periphery or an inner periphery of a race of the bearing, and an extension extending radially from a part of the flange portion and having a bent edge, and the extension is fitted into a stepped portion formed in the side portion of the stator assembly.

A flange is provided by folding the inner periphery or the outer periphery of the needle bearing, and a recess is formed in the flange surface and the recess is fitted to a recess formed in a bush of a stator, an outer race of a one-way clutch or a vane wheel of the stator assembly, thereby preventing axial dislodgment.

A flange is provided by folding the inner periphery or the outer periphery of the needle bearing (however, a part is not cut to form the flange but is extended as it is), and a flange is provided by folding an edge of the extension, and the flange is fitted into a stepped portion formed in a bush of the stator assembly, an outer race of a one-way clutch or a vane wheel of the stator assembly. Incidentally, the stepped portion is provided at an opening portion on an inner peripheral side or an outer peripheral side of a lubricating oil groove provided in the bush of the stator assembly, the outer race of the one-way clutch or the vane wheel of the stator assembly.

DETAILED DESCRIPTION OF THE INVENTION

Figure 1:
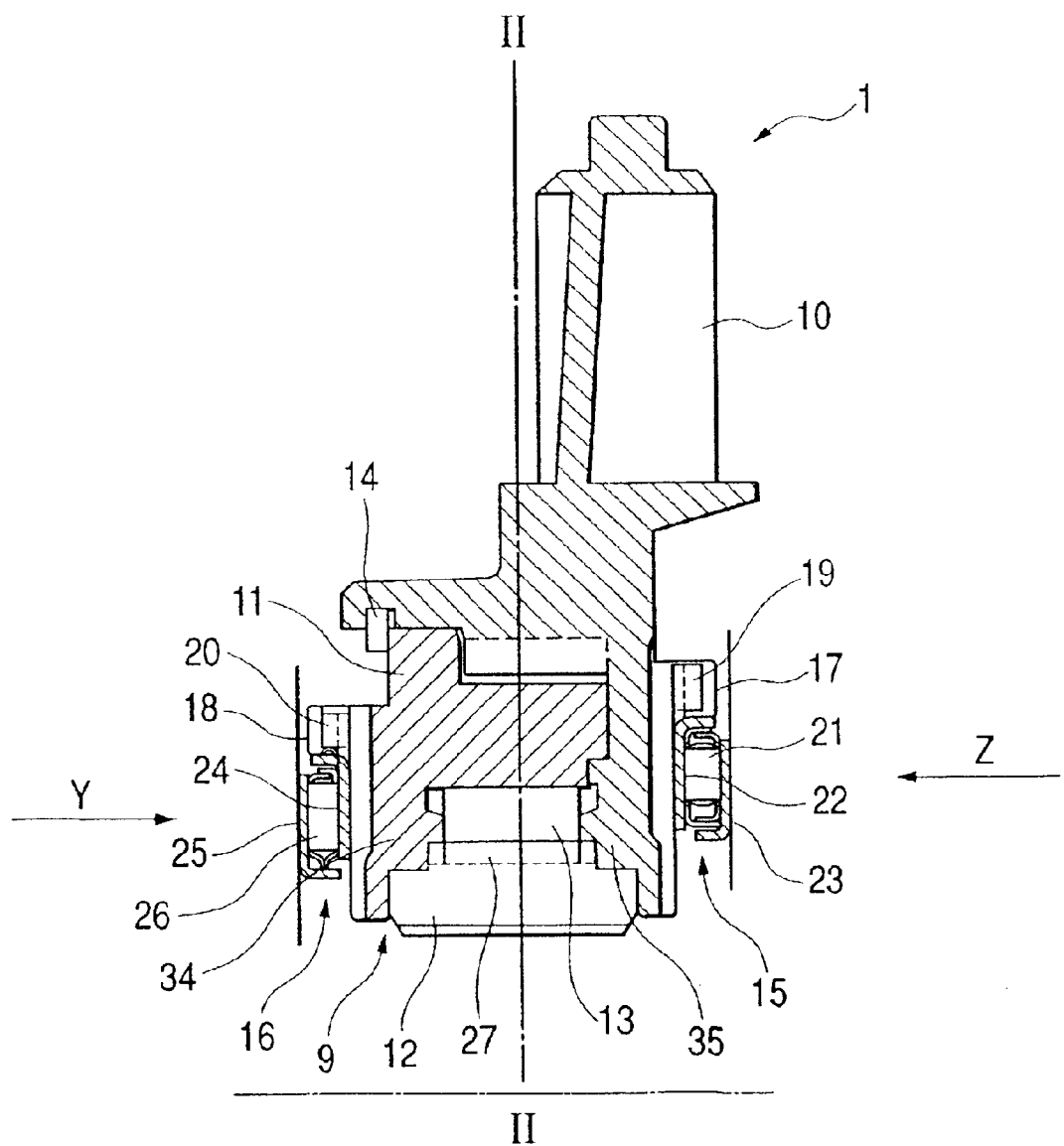
FIG. 1 is an axial sectional view of a stator assembly according to a first embodiment of the present invention (sectional view taken along the line I—I in FIG. 2).

Now, embodiments of the present invention will be fully explained with reference to the accompanying drawings. Incidentally, in the drawings, the same reference numerals designate same parts or elements.

(First Embodiments)

Figure 2:
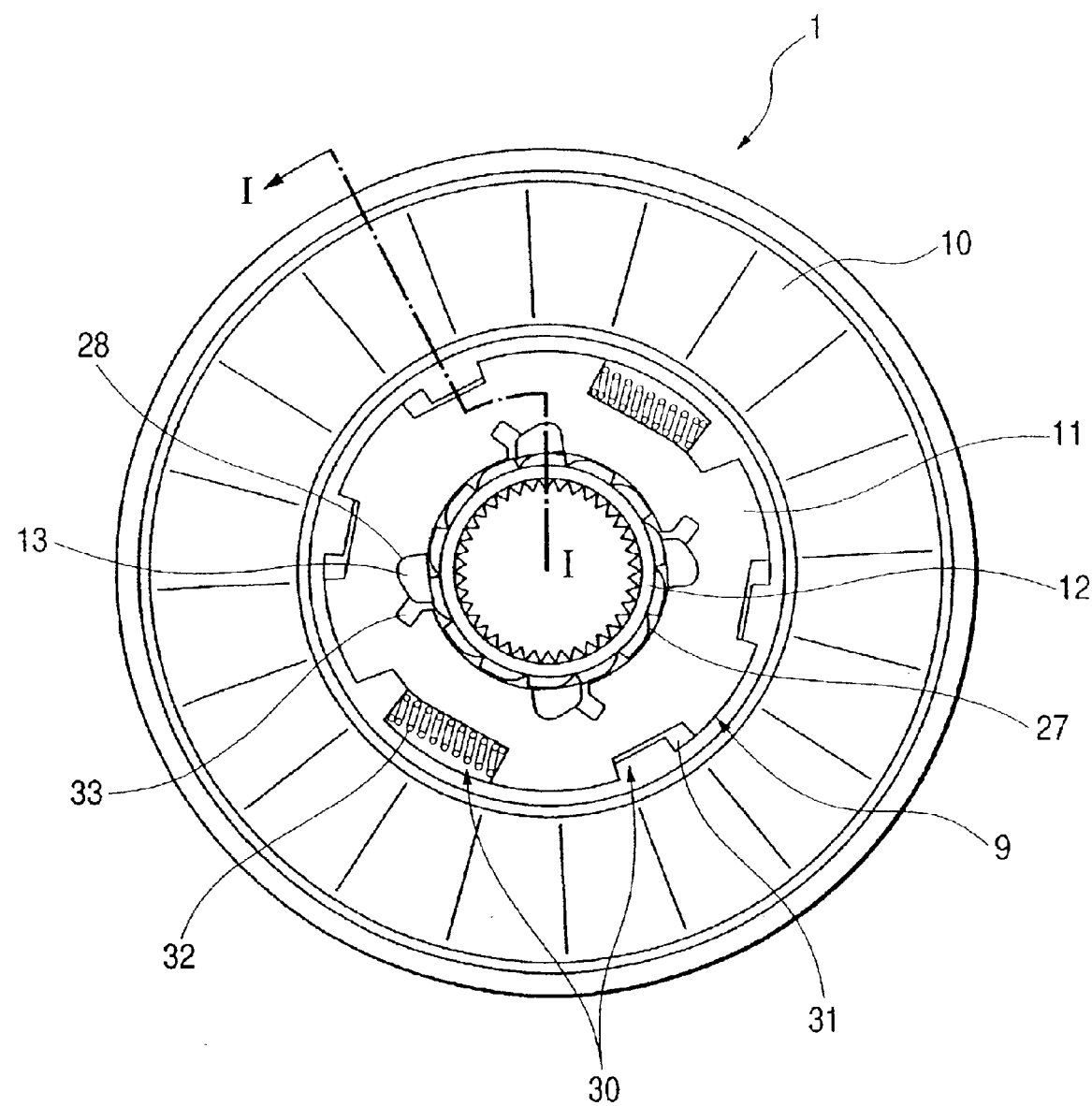
FIG. 2 is a front partial sectional view of the stator assembly according to the first embodiment (sectional view taken along the line II—II in FIG. 1)

FIG. 1 is an axial sectional view of a stator assembly according to a first embodiment of the present invention, and FIG. 2 is a front partial sectional view of the stator assembly according to the first embodiment. Further, FIG. 1 is a sectional view taken along the line I—I in FIG. 2, and FIG. 2 is a sectional view taken along the line II—II in FIG. 1.

In FIG. 1, a stator assembly 1 comprises a vane wheel 10 into an inner periphery of which an outer race 11 of a one-way clutch 9 is fitted. The one-way clutch 9 is a one-way clutch of ratchet type and includes an outer race 11, an inner race 12 disposed at an inner periphery side of the outer race 11 in a concentric relationship thereto, and pawl members 13 contained in pockets 28 (FIG. 2) formed in the outer race 11. Further, recesses 27 into which the pawl members 13 can be fitted are formed in the inner race 12. The outer race 11 is stationarily held with respect to the vane wheel 10 in an axial direction by means of a snap ring 14.

In the one-way clutch 9 having the above-mentioned arrangement, when the one-way clutch 9 is rotated in one direction, since the pawl members 13 are freely slid with respect to the outer periphery of the inner race 12, the outer race 11 and the inner race 12 are idly rotated relative to each other. On the other hand, when the one-way clutch 9 tries to rotate in an opposite direction, the pawl members 13 are engaged by the recesses 27, thereby establishing a lock-up condition of the one-way clutch 9.

The vane wheel 10 of the stator assembly 1 is provided at its inner periphery with a bush portion 35. Further, the outer race 11 is also provided at its inner periphery with a bush portion 34. When the bush portions 34, 35 are slidably engaged by axial both ends of the inner race 12 and the outer race 11, the races are maintained in a concentric condition and the pawl portions 13 of the one-way clutch 9 are held not to be dislodged in the axial direction.

A needle bearing 15 comprises an axially inward inner race 22, an axially outward outer race 23, and rollers 21 disposed between the inner race 22 and the outer race 23. The inner race 22 and the outer race 23 each has a substantially annular shape.

Further, a needle bearing 16 comprises an axially inward inner race 24, an axially outward outer race 25, and rollers 26 disposed between the inner race 24 and the outer race 25. The inner race 24 and the outer race 25 also each has a substantially annular shape.

Stepped portion. 18, 17 are provided axially outwardly of the bush portions 34, 35, respectively, and the inner races 24, 22 of the needle bearings 16, 15 are fitted into the stepped portions, respectively. The inner races 24, 22 are provided with radial extensions 20, 19, respectively, and the extensions 20, 19 are fitted into the stepped portions 18, 17 formed in the bush portions 34, 35, respectively.

Now, the stator assembly will be further explained with reference to FIG. 2. The pawl members 13 are permanently biased to be engaged by the recesses 27 of the inner race 12 by means of accordion springs 33. Further, the outer race 11 of the one-way clutch 9 is provided with a damper mechanism 30. The damper mechanism 30 includes a plurality of damper springs 32 arranged along a circumferential direction. Each damper spring 32 is a coil spring, but other springs may be used.

The damper mechanism 30 further includes damper operation limiting portions 31 so that, if shocks which cannot be absorbed by the damper springs 32 are applied, the damper operation limiting portions 31 are engaged to avoid excessive load acting on the springs 32.

Figure 3:
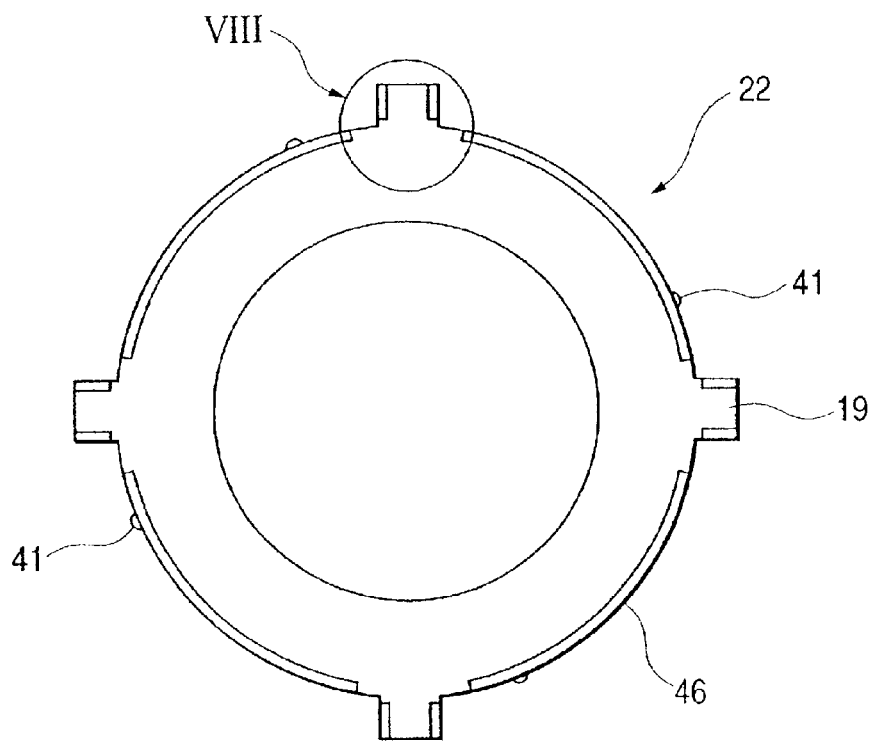
FIG. 3 is a front view of an inner race of a needle bearing at a vane wheel side.
Figure 5:
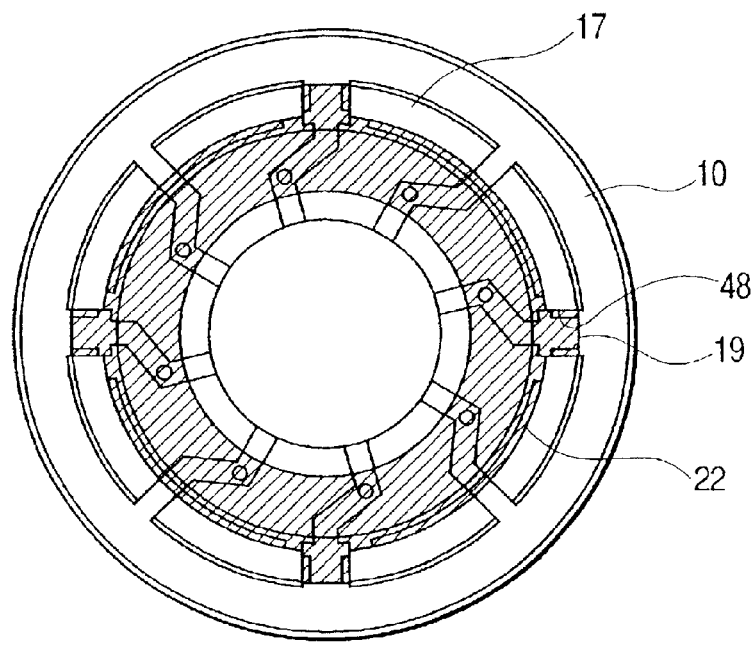
FIG. 5 is a front view showing a condition that the inner race of FIG. 3 is fitted onto an outer race of a one-way clutch.
Figure 6:
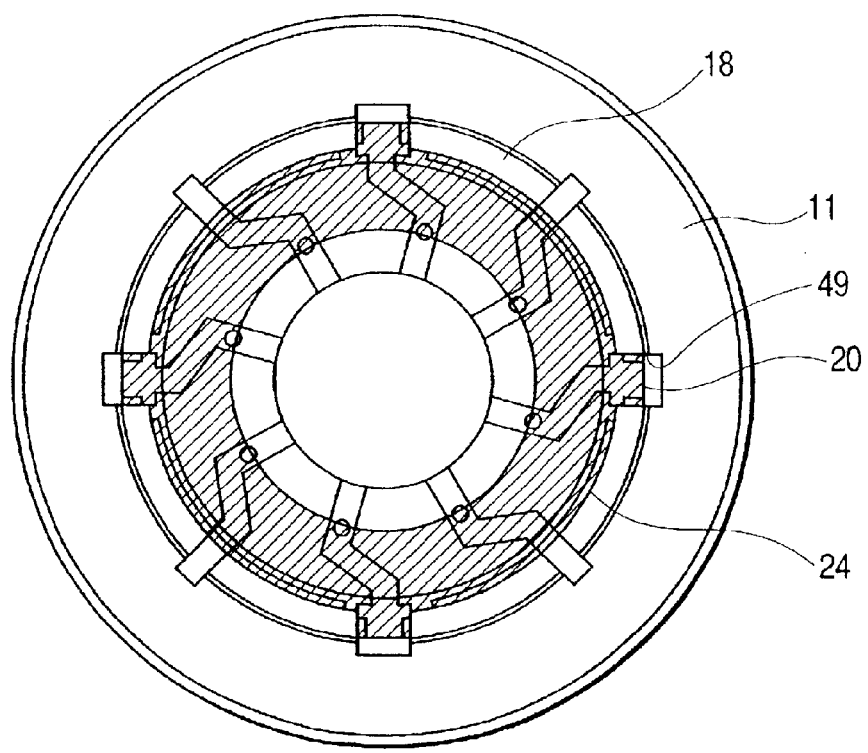
FIG. 6 is a front view showing a condition that the inner race of FIG. 4 is fitted into an inner diameter portion of a vane wheel.

Next, the first embodiment of the present invention will be fully explained with reference to FIGS. 3 to 9. FIG. 3 is a front view of the inner race 22 of the needle bearing 15, FIG. 4 is a front view of the inner race 24 of the needle bearing 16, FIG. 5 is a front view showing a condition that the inner race 22 shown in FIG. 3 is fitted into the inner diameter portion of the vane wheel 10, and FIG. 6 is a front view showing a condition that the inner race 24 is fitted into the outer race 11 of the one-way clutch 9.

As shown in FIG. 3, the inner race 22 of the needle bearing 15 has a generally annular shape and is equidistantly cut at four points along the circumferential direction, and the cut portions constitute radially outwardly extending extensions 19. As explained in connection with FIG. 1, the extensions 19 are fitted in the stepped portion 17 of the bush portion 35 of the vane wheel 10, thereby preventing rotation of the inner race 22.

The inner race 22 of the needle bearing 15 is provided with a generally annular flange portion 46 extending axially between the extensions 19, and small protruded portions or projections 41 are formed on a radially outer surface of the flange portion 46. Four projections 41 are provided equidistantly along the circumferential direction. The projections 41 are engaged by recesses formed in the inner periphery of the stepped portion 17. By such engagement, the inner race 22 is prevented from being shifted axially, that is to say, the needle bearing 15 is prevented from being shifted axially. Incidentally, the projections 41 also act to prevent the rotation of the inner race 22.

Figure 4:
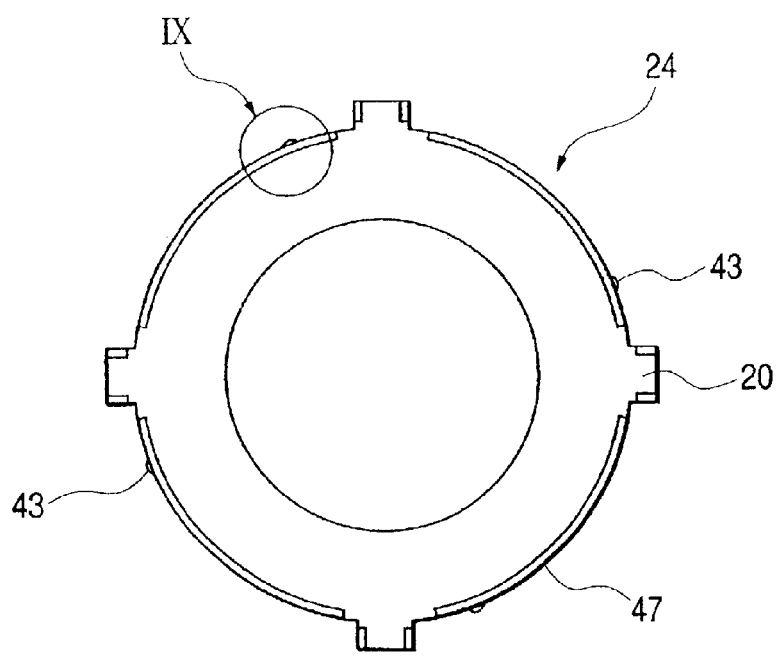
FIG. 4 is a front view of an inner race of a needle bearing at an outer race side.

Further, as shown in FIG. 4, the inner race 24 of the needle bearing 16 has a generally annular shape and is equidistantly cut at four points along the circumferential direction, and the cut portions constitute radially outwardly extending extensions 20. As explained in connection with FIG. 1, the extensions 20 are fitted in the stepped portion 18 of the bush portion 34 of the outer race 11, thereby preventing rotation of the inner race 24.

The inner race 24 of the needle bearing 16 is provided with a generally annular flange portion 47 extending axially between the extensions 20, and small protruded portions or projections 43 are formed on a radially outer surface of the flange portion 47. Four projections 43 are provided equidistantly along the circumferential direction. The projections 43 are engaged by recesses formed in the inner periphery of the stepped portion 18. By such engagement, the inner race 24 is prevented from being shifted axially, that is to say, the needle bearing 16 is prevented from being shifted axially. Incidentally, the projections 43 also act to prevent the rotation of the inner race 24.

As shown in FIGS. 5 and 6, the extensions 19 of the inner race 22 are fitted into recesses provided in the stepped portion 17 of the vane wheel 10. Further, the extensions 20 of the inner race 24 are fitted into recesses provided in the stepped portion 18 of the outer race 11.

Figure 7:
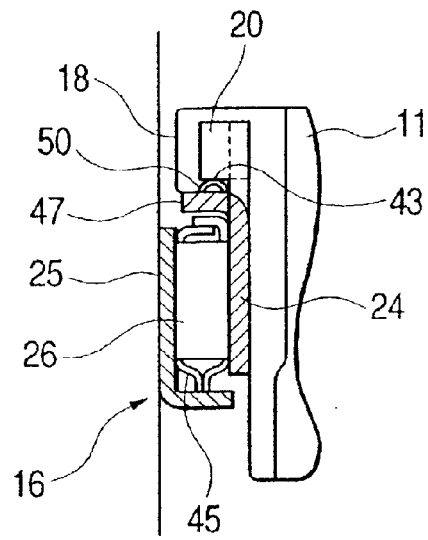
FIG. 7 is a sectional view showing a relationship between a bush portion of an outer race and a needle bearing of the stator assembly shown in FIG. 1.

FIG. 7 is a sectional view showing a relationship between the bush portion 34 of the outer race 11 and the needle bearing 16 of the stator assembly 1 shown in FIG. 1. The projections 43 provided on the outer peripheral surface of the flange portion 47 of the inner race 24 are fitted in the recesses 50 provided in the inner periphery of the stepped portion 18 of the outer race 11. The projections 43 and the recesses 50 preferably have complementary shapes, but, different shapes may be adopted so long as the projections 43 can be contained within the recesses 50. Incidentally, the reference numeral 45 denotes a holder for holding the rollers 26.

Figure 8:
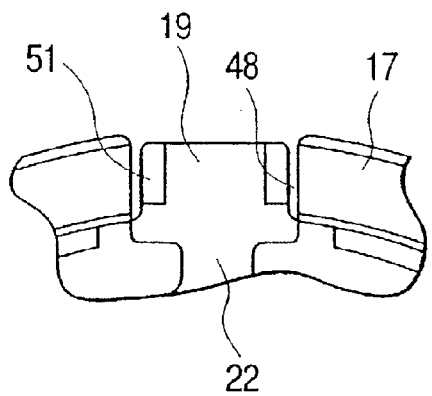
FIG. 8 is a partial front view showing a portion VIII of FIG. 3 in detail.

FIG. 8 is a partial front view showing a portion VI of FIG. 3 in detail. The extension 19 of the inner race 22 is fitted in a recess 48 of the stepped portion 17. Folded portions 51 are provided on both circumferential edges of the extension 19, and, by fitting the folded portions 51 in the recesses of the stepped portion 17, the rotation of the inner race 22 is prevented. Regarding the inner race 24 of the needle bearing 16 (FIG. 7) at the outer race side, similar folded portions are provided, thereby preventing the rotation of the inner race 24.

Figure 9:
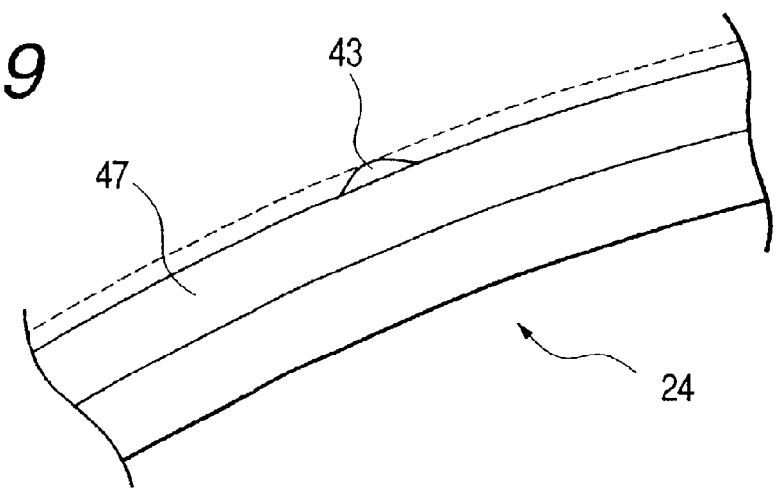
FIG. 9 is an enlarged view of a portion IX of FIG. 4.

FIG. 9 is an enlarged view of a portion IX of FIG. 4. It can clearly be seen that the small projections 43 are formed on the outer peripheral surface of the flange portion 47 of the inner race 24 of the needle bearing 16. Of course, a dimension and a height of the projection 43 can be set appropriately.

(Second Embodiment)

Figure 10:
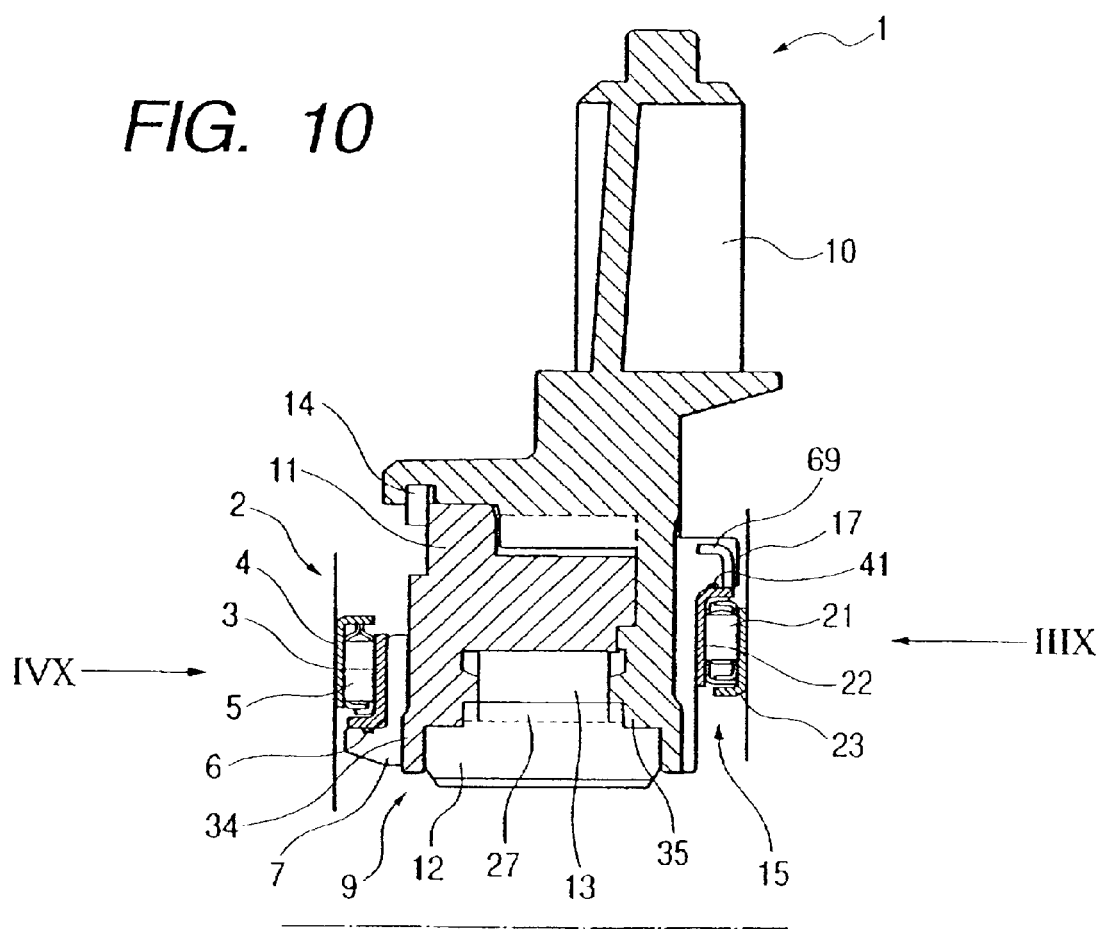
FIG. 10 is an axial sectional view of a stator assembly according to a second embodiment of the present invention.

FIG. 10 is an axial sectional view of a stator assembly according to a second embodiment of the present invention. Since an arrangement at the vane wheel side is substantially the same as that in the first embodiment except for construction (described later) of extensions of the inner race 22, explanation thereof will be omitted. Only an arrangement at the outer race 11 side will be explained. A stepped portion 7 is provided at an inner diameter side of the bush portion 34 of the outer race 11, and a needle bearing 2 is held in the stepped portion 7.

Figure 11:
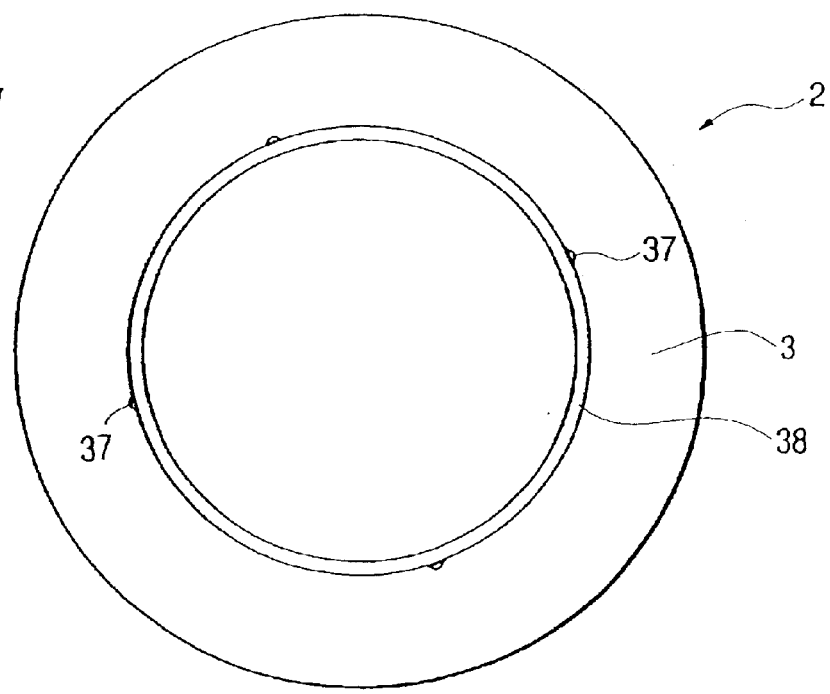
FIG. 11 is a front view of an inner race of a needle bearing at an outer race side.
Figure 12:
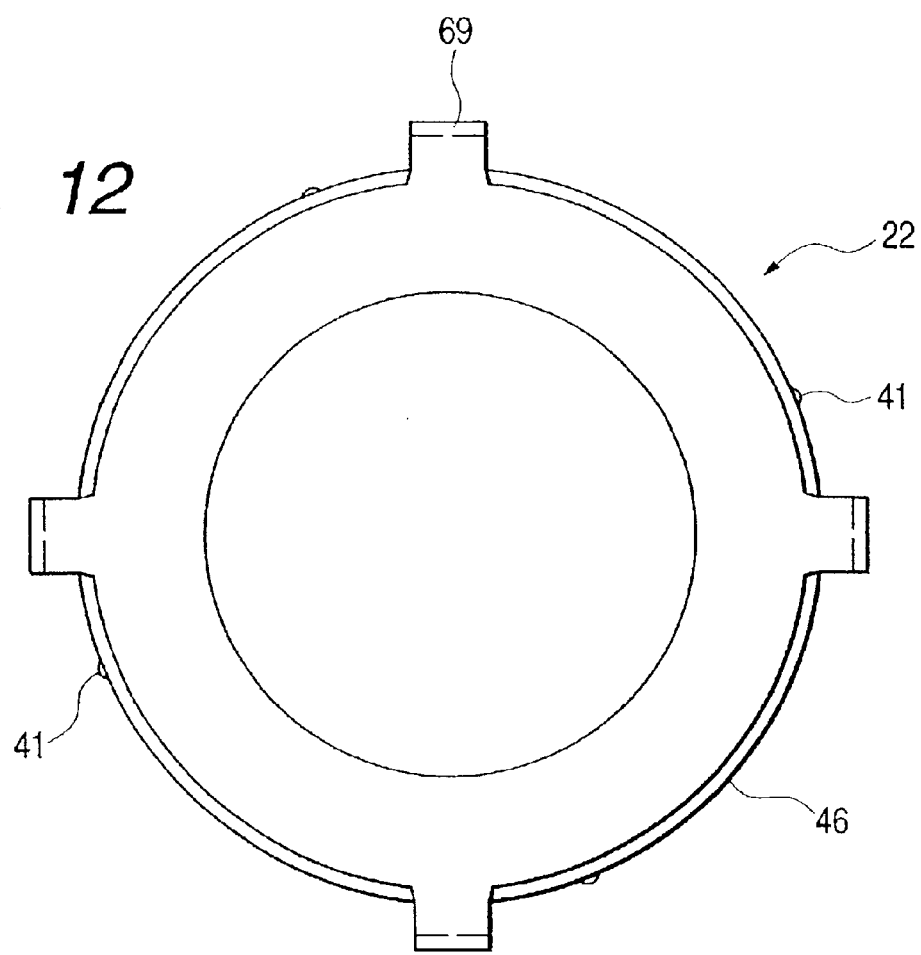
FIG. 12 is a front view of inner race of a needle bearing at a vane wheel side.

FIG. 11 is a front view of an inner race 3 of the needle bearing 2, and FIG. 12 is a front view of the inner race 22 of the needle bearing 15. The needle bearing 2 comprises a generally annular inner race 3, a generally annular outer race 4, and rollers 5 disposed between the inner race 3 and the outer race 4. Recesses 6 are formed in an outer peripheral surface of the stepped portion 7, and, when small projections 37 provided on an outer peripheral surface of a flange portion 38 of the inner race 3 are fitted into the recesses 6 of the stepped portion 7, axial and circumferential shifting movements of the inner race 3 are restricted.

Further, as shown in FIG. 12, extensions 69 of the inner race 22 of the needle bearing 15 at the side of the vane wheel 10 differ from those in the first embodiment and do not have circumferential folded portions. The extensions 69 are bent at a substantially right angle toward the bush portion 35 of the vane wheel 10. The right angle bent portions are fitted into recesses provided in the stepped portion 17, thereby preventing circumferential rotation.

Figure 13:
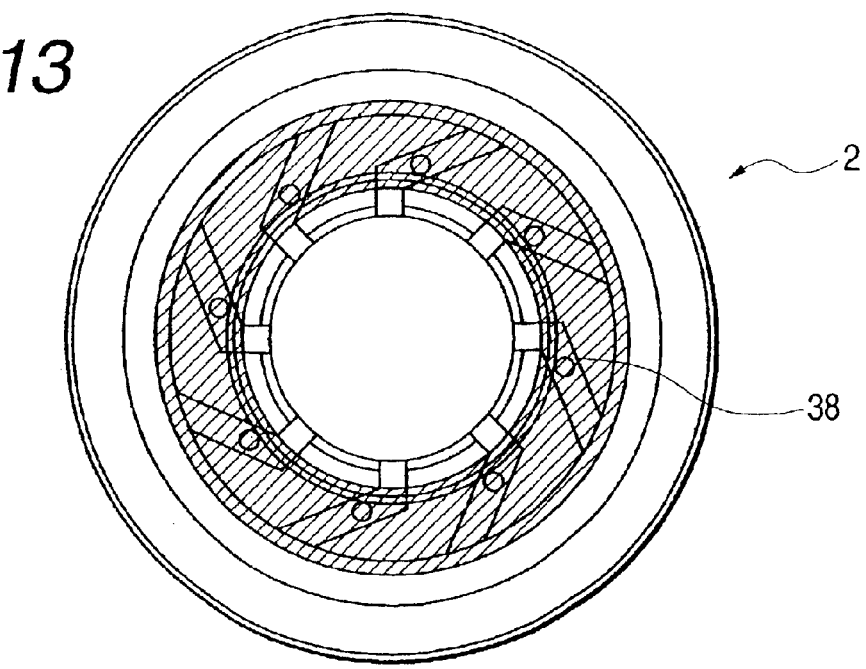
FIG. 13 is a front view showing a condition that the inner race of FIG. 11 is fitted into an inner diameter portion of a vane wheel.
Figure 14:
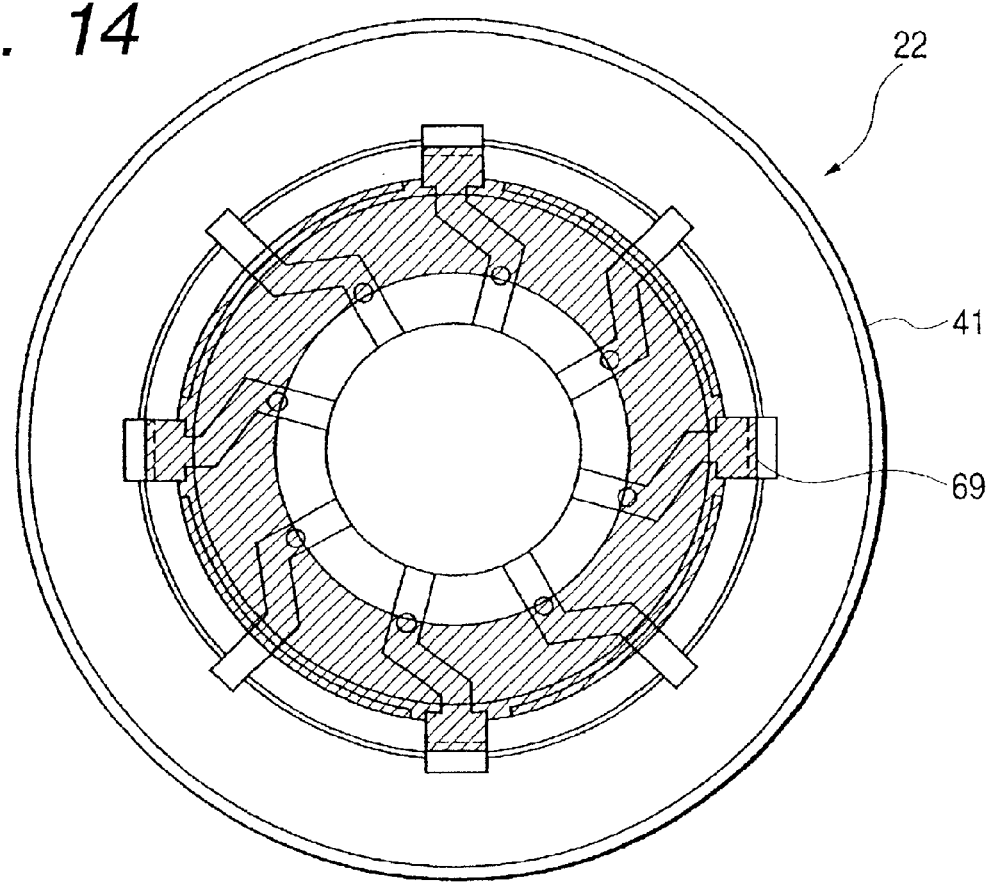
FIG. 14 is a front view showing a condition that the inner race of FIG. 12 is fitted onto an outer race.

FIG. 13 is a front view looked at from a direction shown by the arrow IIIX in FIG. 10, showing a condition that the inner race 22 of FIG. 11 is fitted in the inner diameter portion of the vane wheel, and FIG. 14 is a front view looked at from a direction shown by the arrow IVX in FIG. 10, showing a condition that the inner race 3 of FIG. 12 is fitted into the outer race 11.

Figure 15:
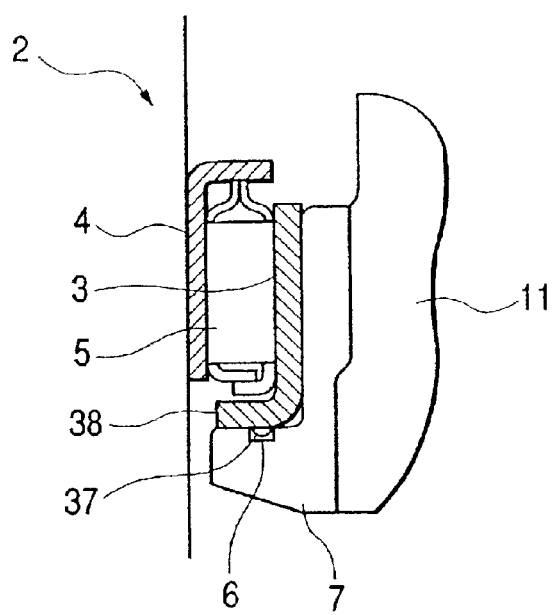
FIG. 15 is an enlarged view of a needle bearing at an outer race side and therearound in FIG. 10.

FIG. 15 is an enlarged view of the needle bearing 2 at the side of the outer race 11 and therearound in FIG. 10. FIG. 15 shows a condition that the projection 37 formed on the outer peripheral surface of the flange portion 38 of the inner race 3 is fitted into the recess 6 formed in the inner periphery of the stepped portion 7 of the outer race 11.

Figure 16:
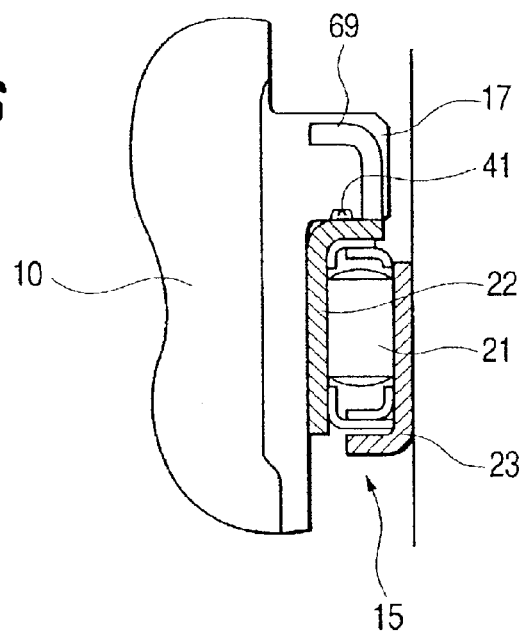
FIG. 16 is an enlarged view of a needle bearing at a vane wheel side and therearound in FIG. 10.
Figure 17:
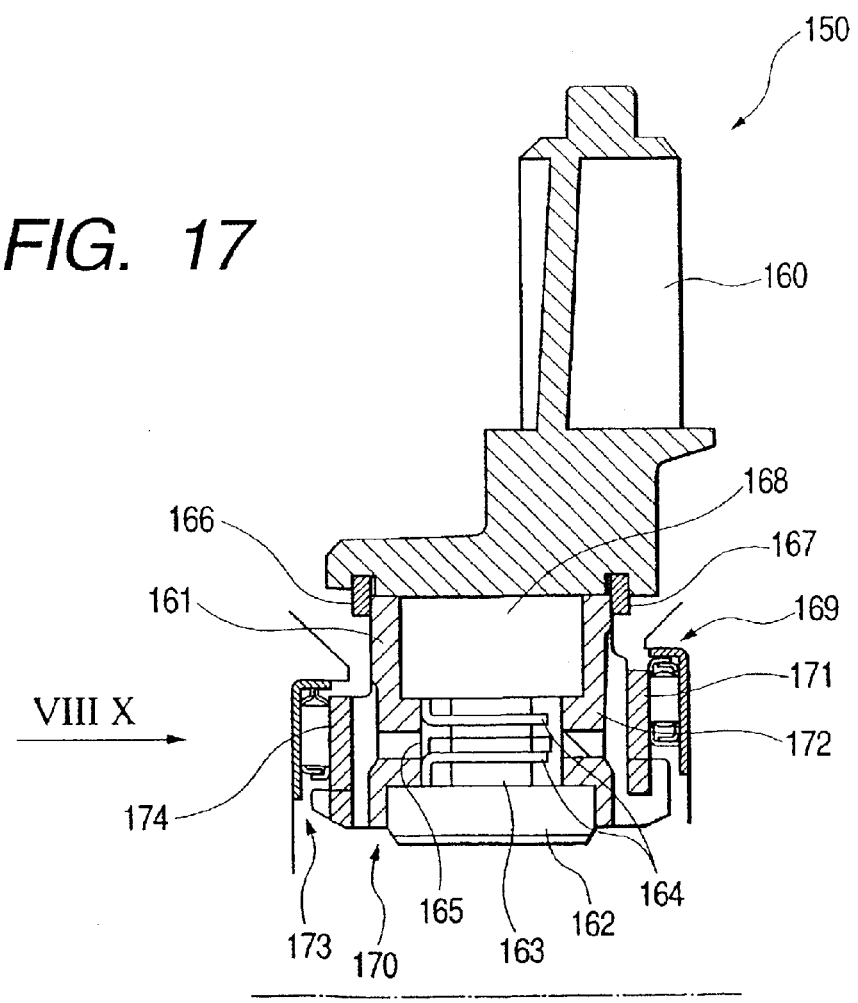
FIG. 17 is an axial sectional view of a conventional stator assembly into which needle bearings are incorporated.
Figure 18:
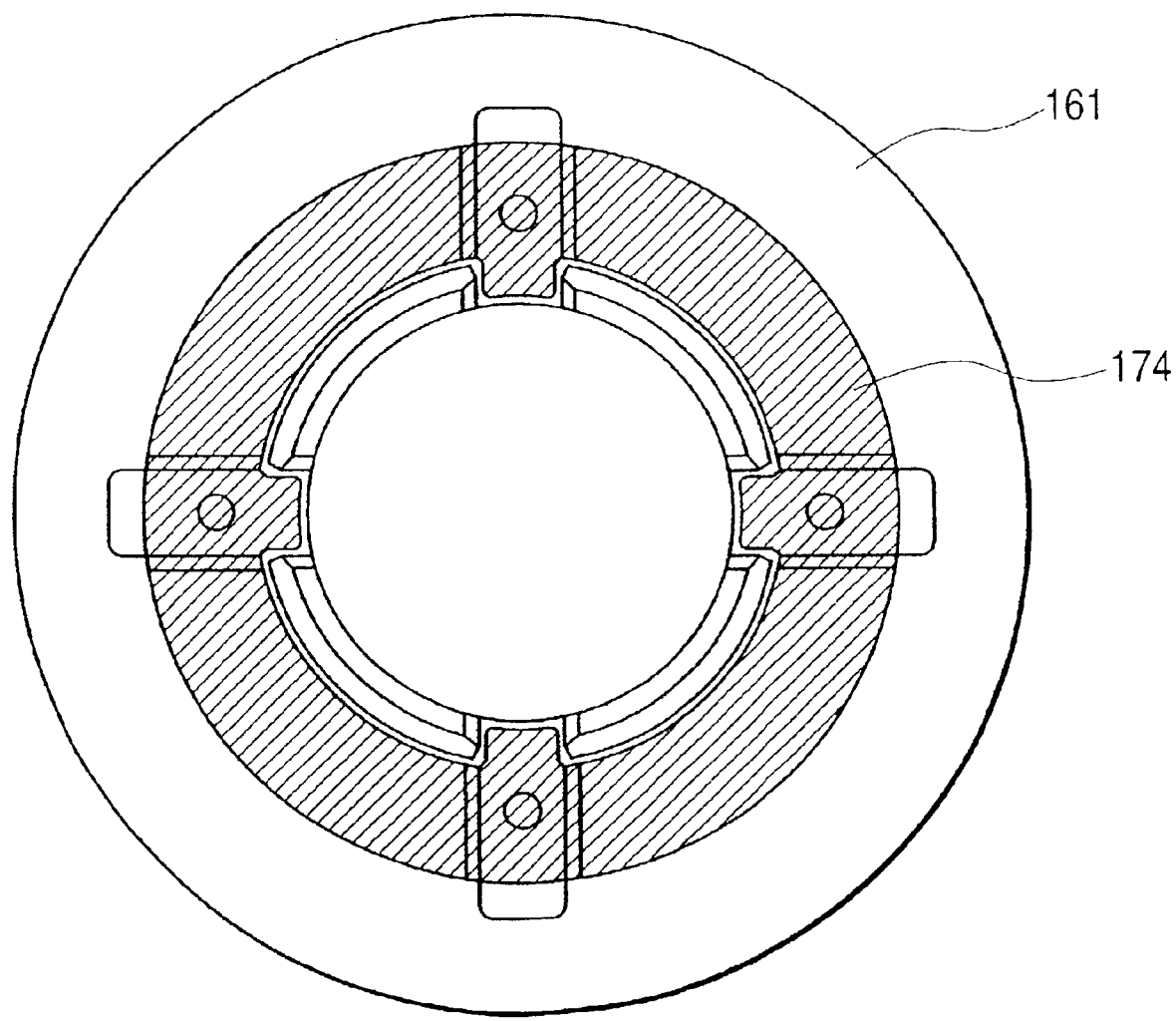
FIG. 18 is a front view of the stator assembly of FIG. 17, looked at from a direction shown by the arrow VIIIX.

Further, FIG. 16 is an enlarged view of the needle bearing 15 at the side of a vane wheel 10 and therearound in FIG. 10. FIG. 16 clearly shows a condition that the projection 41 formed on the outer peripheral surface of the flange portion of the inner race 22 is fitted into the recess of the stepped portion 17. Further, a condition that the bent portion of the extension 69 of the inner race 22 is fitted into the recess provided in the stepped portion 17 in the circumferential direction is also shown.

It should be noted that the above-mentioned embodiments of the stator assembly according to the present invention are explained merely as examples of the present invention and do not limit the present invention. For example, in the above-mentioned embodiments, while an example that the one-way clutch of ratchet type is used was explained, the kind of the one-way clutch is not particularly limited, but, other one-way clutches, for example, a one-way clutch of sprag type may be used. Further, the recesses of the flange portion for receiving the projections may be replaced by grooves.

Further, dimension, number, location and shape of the projections and the extensions are not particularly limited. Such dimension may be selected appropriately so long as the present invention can be carried out. Further, while an example in which the needle bearing of race integral type is used was explained, other needle bearings can be used. However, the needle bearing of race integral type ham an advantage for improving productivity in the point that such a needle bearing has a thinner race in comparison with the conventional ones, so that, when used in the present invention, the projections and the extensions can be formed by press working.

According to the present invention as mentioned above, the following advantage can be achieved.

That is to say, by engaging the projections with the recesses, a stator assembly that can be handled integrally or collectively, including needle bearings can be provided.

What is claimed is:

1. A stator assembly in which an axial side portion of said assembly is axially supported by a needle bearing, wherein:

a projection is formed on a flange portion provided on a race of said needle bearing and said projection is fitted into a recess formed in said side portion of said stator assembly, said projection and said recess being constructed to restrict axial movement of said needle bearing.

2. A stator assembly according to claim 1, wherein a plurality of said projections and said recesses are provided spaced circumferentially of said stator assembly.

3. A stator assembly in which an axial side portion of said assembly is axially supported by a needle bearing, wherein:

said needle bearing includes a flange portion formed by cutting an outer periphery or an inner periphery of a race of said bearing, and an extension extending radially from a part of said flange portion and having a bent edge, and said extension is fitted into a stepped portion formed in said side portion of said stator assembly.

4. A stator assembly according to claim 1, wherein said stator assembly has a vane wheel provided with a one-way clutch in an inner periphery thereof and said recess is a groove provided in an inner diameter portion of said vane wheel, an outer race of said one-way clutch, or a bush.

5. A stator assembly in which an axial side portion of said assembly is axially supported by a needle bearing, wherein:

a race of said needle bearing has a projection fitted into a recess formed in said side portion of said stator assembly, said projection and said recess being constructed to restrict axial movement of said needle bearing.

6. A stator assembly according to claim 5, wherein a plurality of said projections are formed on said race of said needle bearing and are fitted into a recess formed in said side portion of said stator assembly.

7. A stator assembly according to claim 1, wherein the projection is a radial projection on the flange portion provided on a race of the needle bearing.

8. A stator assembly according to claim 5, wherein the projection is a radial projection on a race of the needle bearing.

* * * * *